United States Patent
De Jongh et al.

(12) 
(10) Patent No.: US 6,511,116 B1
(45) Date of Patent: Jan. 28, 2003

(54) MOUNTING BRACKET FOR VEHICLE VISOR AND METHOD OF MOUNTING BRACKET AND VISOR IN A VEHICLE

(75) Inventors: Mark Alan De Jongh, Ann Arbor, MI (US); Michael John Sweers, Williamston, MI (US)

(73) Assignee: Toyota Technical Center, USA, Inc., Ann Arbor, MI (US)

( * ) Notice: Subject to any disclaimer, the term of this patent is extended or adjusted under 35 U.S.C. 154(b) by 0 days.

(21) Appl. No.: 09/900,249

(22) Filed: Jul. 6, 2001

(51) Int. Cl.[7] .................................................. B60J 3/02
(52) U.S. Cl. .................................. 296/97.9; 248/222.52
(58) Field of Search ........................... 296/97.9, 97.1, 296/97.12, 214; 248/289.11, 231.9, 222.51, 222.52

(56) References Cited

U.S. PATENT DOCUMENTS

| | | | | |
|---|---|---|---|---|
| 3,017,217 A | * | 1/1962 | Keating ................. | 248/289.11 |
| 4,521,046 A | | 6/1985 | Foggini | |
| 4,756,570 A | | 7/1988 | Cooper | |
| 5,031,954 A | | 7/1991 | Peterson et al. | |
| 5,056,853 A | * | 10/1991 | Van Order ................. | 296/97.9 |
| 5,082,322 A | * | 1/1992 | Cekander et al. .......... | 296/97.9 |
| 5,451,022 A | * | 9/1995 | Peterson ................. | 248/289.11 |
| 5,857,728 A | * | 1/1999 | Crotty, III ................. | 296/97.9 |
| 6,068,323 A | * | 5/2000 | Brown et al. ............... | 296/97.9 |
| 6,250,708 B1 | * | 6/2001 | Kurachi ..................... | 296/97.9 |

FOREIGN PATENT DOCUMENTS

| | | |
|---|---|---|
| JP | SHO-59-28092 | 2/1984 |
| JP | SHO 63-43641 | 3/1988 |
| JP | SHO-63-43642 | 3/1988 |

* cited by examiner

Primary Examiner—D. Glenn Dayoan
Assistant Examiner—Patricia Engle
(74) Attorney, Agent, or Firm—Gifford, Krass, Groh, Sprinkle, Anderson & Citkowski, P.C.

(57) ABSTRACT

A mounting bracket assembly for supporting a sun shade visor to a vehicle includes a bracket having hooks and a center boss. A circular aperture and slots are formed in the headliner to receive the hooks and boss. The end of the rod supporting the visor has a finger extending radially outwardly to engage an abutment portion in the boss. The rod is inserted into the bracket and pivoted within the bracket to move the finger against the abutment surface. The bracket is inserted into the slots and the aperture of the headliner and the visor is twisted to move the hooks into engagement with the headliner.

12 Claims, 3 Drawing Sheets

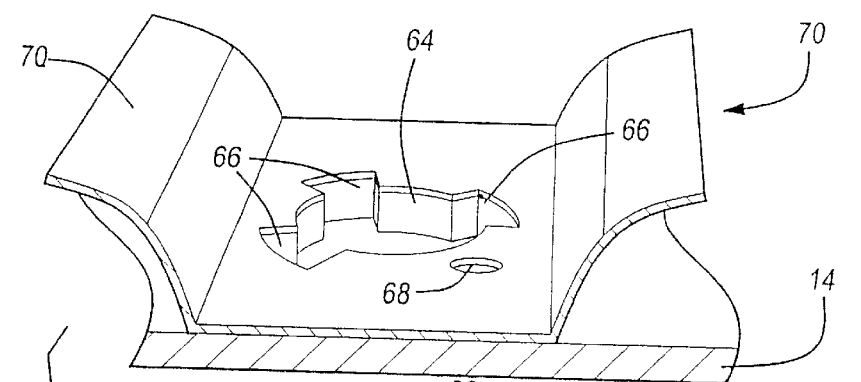
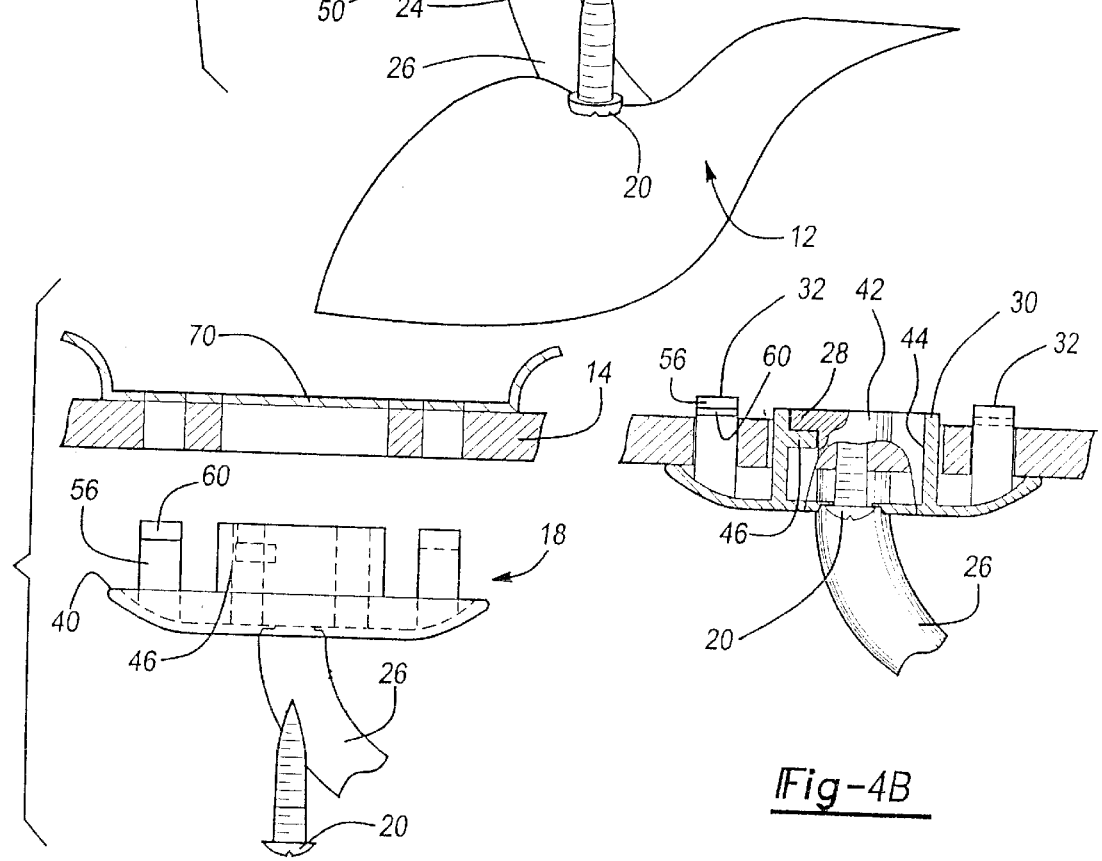
Fig-3
Fig-4A
Fig-4B

MOUNTING BRACKET FOR VEHICLE VISOR AND METHOD OF MOUNTING BRACKET AND VISOR IN A VEHICLE

BACKGROUND OF THE INVENTION

I. Field of the Invention

The present invention relates generally to brackets for mounting sun shade visors to vehicles and, more particularly, to a mounting bracket which is rotatably installed to a headliner of a vehicle.

II. Description of the Prior Art

Sun shade visors for vehicles typically have a visor blade which pivots on an arm mounted to the vehicle. The arm has an elbow which is received in a bracket mounted to the headliner of the vehicle. The visor blade pivots horizontally on the arm between a storage position against the headliner to a use position where the visor shades an upper portion of the windshield. The bracket supports the visor blade and elbow for pivotal movement in the use position between the windshield and a side window. Many brackets are known for use in mounting the elbow to the headliner. One type of bracket has a center bore for receiving the arm and has outer flanges which are mounted to the headliner by screws, such as disclosed in U.S. Pat. No. 4,756,570 to Cooper.

It is also known to mount a bracket to a headliner without screws using a three piece bracket assembly, such as disclosed in U.S. Pat. No. 5,031,954 to Peterson, et al. Peterson, et al. discloses forming a square aperture in the headliner and an inner bracket having a square shaped inner flange which is inserted through the square aperture. The elbow is inserted into the inner bracket and rotated to rotate the flange so that the corners of the flange overlay the inner surface of the headliner. An outer bracket is inserted through a separate aperture in the headliner to engage one corner of the inner bracket and lock it into position. Finally, a cover is snapped in place over the inner and outer brackets to cover the assembly. However, assembly of this bracket requires a number of steps, including inserting the outer cover over the elbow, inserting the elbow into the outer bracket, rotating the outer bracket, inserting the inner bracket into a hole, and finally, pushing the outer cover into position over the inner and outer brackets.

It would be desirable to provide a mounting bracket which is inexpensively produced and easily assembled. It is a further object of the invention to provide a bracket which does not require a separate cover and the associated assembly.

SUMMARY OF THE PRESENT INVENTION

Accordingly, a mounting apparatus for mounting the elbow of an arm supporting a visor assembly to a vehicle includes a bracket body and a fastener member. The elbow has a radially extending finger portion at its end. The bracket has a body with a circular dish portion having a central aperture. A cylindrical boss extends coaxially with the aperture for receiving the elbow. The boss has an inner wall having a radially inwardly extending abutment portion. A plurality of hooks extend from an underside of the skirt. A circular aperture is formed in the headliner to receive the boss. A plurality of arced slots are formed in the headliner to receive the hooks. The elbow is inserted through the aperture into the boss. The elbow is rotated within the throughbore until the finger contacts the abutment portion. The boss and the hooks are then inserted into the circular aperture and slots formed in the headliner. The elbow is then twisted to rotate the body and move the hooks to engage the headliner. A fastener, such as a screw, is inserted through a hole in the dished portion and into the headliner to prevent rotation and complete the assembly.

BRIEF DESCRIPTION OF THE DRAWINGS

The foregoing and other objects and advantages of the present invention will become readily apparent to those skilled in the art upon studying the following detailed description, when considered in connection with the accompanying drawings, in which:

FIG. 3 is an exploded perspective view of the bracket and headliner of the circle 3 of FIG. 2 in accordance with the invention;

FIG. 4a is an exploded side view of the mounting bracket, headliner and fastener just before assembly into the headliner in accordance with the invention;

FIG. 4b is an exploded side view of the bracket and headliner after assembly in the headliner in accordance with the invention;

DETAILED DESCRIPTION OF THE PREFERRED EMBODIMENT

Figure 2:
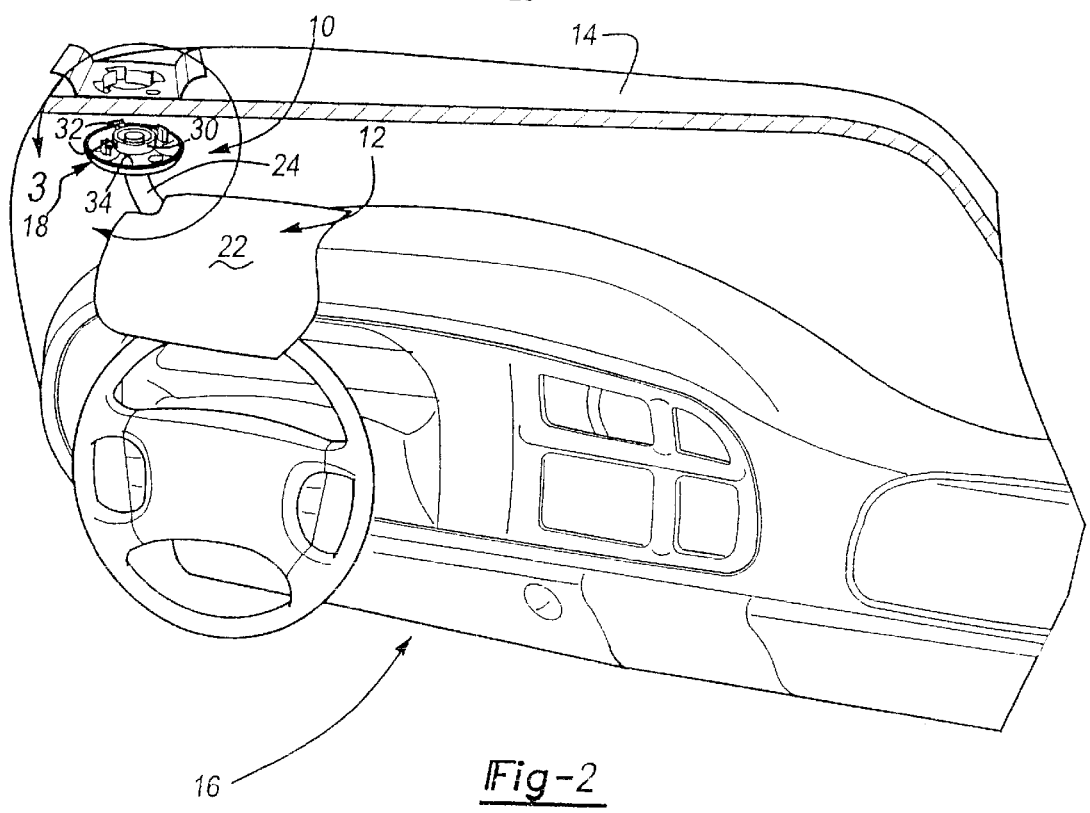
FIG. 2 is a perspective view of the visor and bracket before assembly in accordance with the invention.

An improved bracket assembly 10 for mounting a sun shade visor assembly 12 to a headliner 14 of a vehicle 16 is shown in FIGS. 2–3. The sun shade visor assembly 12 includes a visor blade 22 which is rotatably mounted to an arm 24. The arm 24 has an elbow portion 26 extending from the top of the blade 22. A finger 28 extends radially outwardly from an end of the arm 24. The blade 22 is mounted to pivot between a storage position against the headliner 14 and a use position covering an upper portion of a windshield, as shown in FIG. 2.

Figure 1:
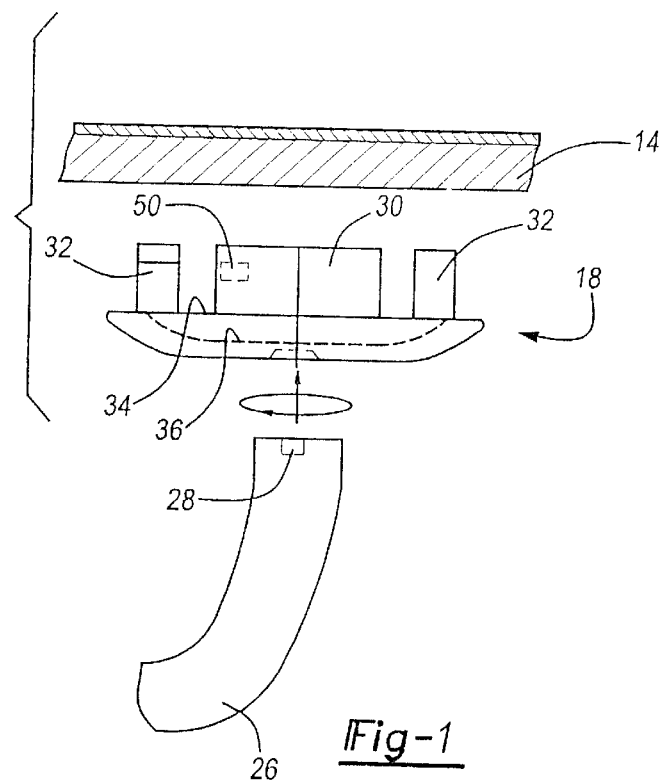
FIG. 1 is an exploded side view of a portion of the headliner, mounting bracket, and visor elbow in accordance with the invention.

As shown in FIGS. 1, 3 and 4, the bracket assembly 10 includes a body 18 having a cylindrical center boss 30 and three hooks 32 extending from an underside 34 of a circular dish portion 36. The dish portion 36 has a smooth outer surface 38 which curves from a generally planar center portion to a radially aligned circumferential edge 40. An aperture 42 is formed to receive the elbow 26 therethrough into the boss 30.

Figure 5:
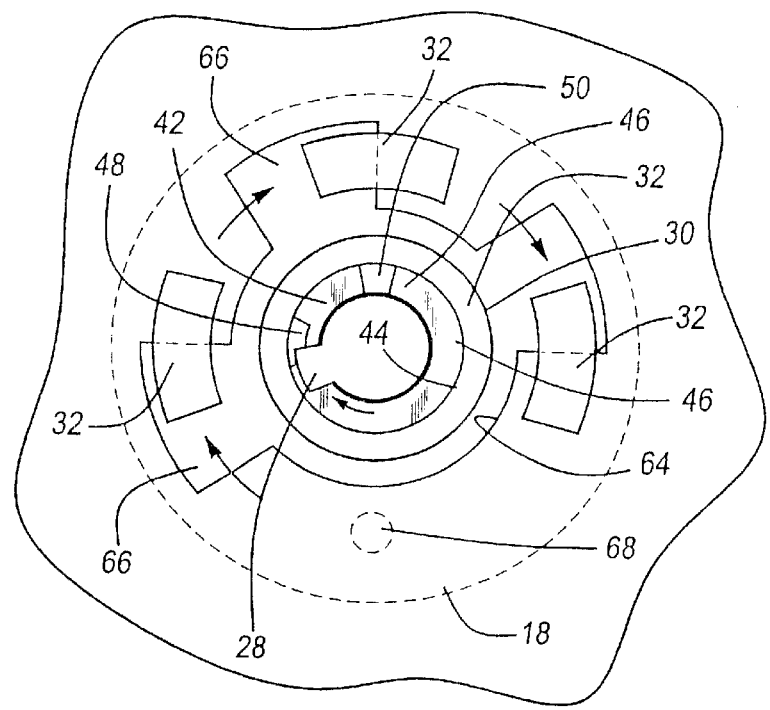
FIG. 5 is a partial plan view of the headliner and mounting bracket taken from the rear side of the headliner as the bracket is being twisted into position in accordance with the invention.

As shown in FIGS. 4b and 5, the boss 30 extends beyond the circumferential edge 40 of the dish portion 36. The boss 30 extends coaxially with the aperture 42 and has an inner surface 44 with a radius slightly larger than the radius of the finger 28 of the elbow 26. An annular flange 46 extends from the inner surface 44 of the boss 30 to provide a guide surface for the finger 28. A slot 48 is formed in the flange 46 to accept the finger 28 when the elbow 26 is inserted into the body. An abutment portion 50 extends from the inner surface 44 above the flange 46 to engage the finger 28 to facilitate mounting of the body 18 as discussed below.

As shown in FIGS. 4a, and 4b, the hooks 32 extend outwardly from the inner surface 44 in the same direction as the boss 30. Each hook 32 has an arm portion 52 extending from a post portion 54. Each hook 32 is spaced radially outwardly from the boss 30 an equal distance. Each arm portion has a flat inner surface 56 spaced apart a predetermined distance from the circumferential edge 40 of the dish portion 36. This distance is equal or slightly less than the thickness of the headliner. At a free end 58 of the arm portion, the inner surface 56 may angle upwardly towards a top surface 60 of the arm to facilitate positioning and rotation of the hooks 32. A hole 62 is formed in the dish portion for receiving the fastening member 20. The hole 62 is spaced radially outwardly from the boss 30. The body 18 is unitarily molded of a rigid material, such as plastic.

As shown in FIGS. 3 and 4, the fastener 20 is a screw, however other types of fasteners, such as mushroom inserts, may be used.

As best shown in FIGS. 3 and 5, a circular aperture 64 is formed in the headliner 14 to receive the boss 30 of the body 18. Three arced slots 66 are spaced radially outwardly from the aperture 64 to receive the hooks 32 of the body. The slots 66 may be spaced apart from the circular aperture 64 or extend radially from the circular aperture 64, as shown in FIG. 5. A throughbore 68 is positioned radially outwardly from the aperture 64 to receive the fastener 20.

The headliner 14 is typically composed of a foam core sandwiched between a flexible outer skin and a rigid backboard. In some cases, the headliners do not have sufficient strength to support the sun shade assembly, making it necessary to mount a metal bracket 70 extending between the roof of the vehicle and the headliner to act as a backing plate. In such a case, the apertures 64, 68 and slots 66 are formed through the headliner 14 and the metal bracket 70.

METHOD OF ASSEMBLY

As shown in FIGS. 4a, 4b, 5 and 6, the sun visor assembly 12 is assembled to the headliner 14 by first extending the elbow 26 through the aperture 42 and boss 30 with the finger 28 of the arm passing through the slot 48 of the flange 46. The elbow 26 is then rotated within the boss 30 until the finger 28 contacts the abutment portion 50 of the boss as shown in FIG. 3.

Figure 6:
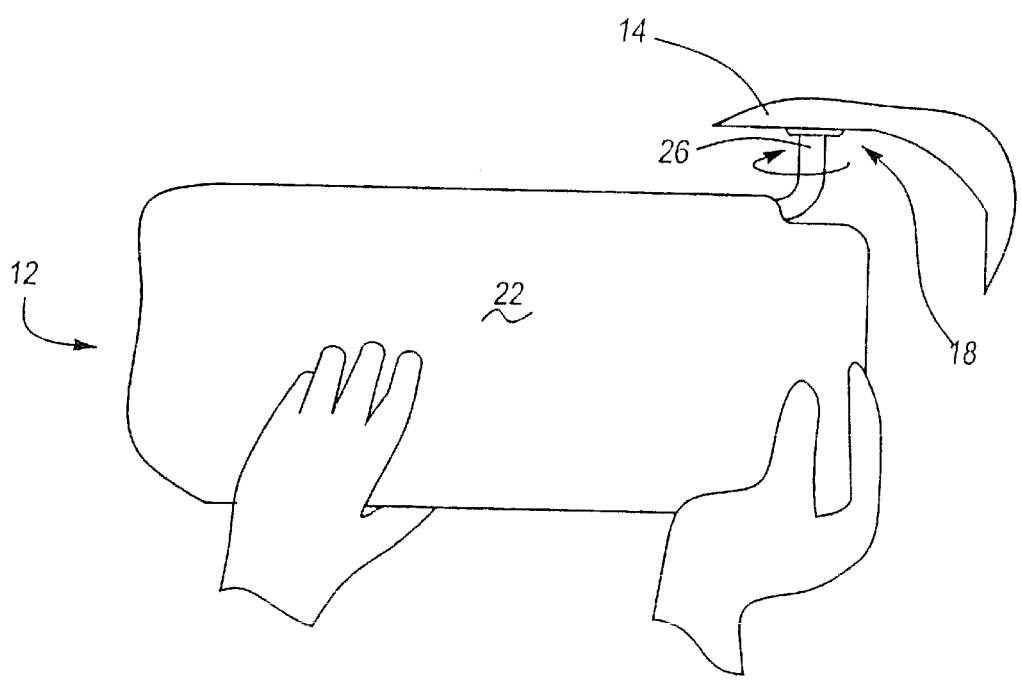
FIG. 6 is a front view of the assembly of the visor as it is being twisted into the headliner in accordance with the invention.

The boss 30 and hooks 32 are then inserted through the headliner 14 with the boss positioned in the center aperture 62 and the hooks extending into the arced slots 48. The elbow 26 is then rotated further in the same direction as before to push the arm portion 52 of the hooks over the inner surface of the headliner 14 or metal bracket 70. As shown in FIGS. 4b, 5 and 6, the inner surface 56 of the arm portions 52 may be angled at the ends to facilitate the rotation. Since the foam core of the headliner 14 is normally resilient, the circumferential edge 40 of the dish portion 36 is compressed slightly into the headliner 14 as the body 18 is rotated. The body 18 is rotated until the post portions 54 of the hooks 32 contact the ends of the slots 48. The hole 62 and aperture 68 are thus aligned and the fastener 20 is then inserted to prevent the body from being twisted and removed from the headliner 14. The finger 28 of the elbow 26 rides on the flange 46 of the boss 30 to permit rotation of the visor from the windshield to the side. The visor is permitted to pivot through approximately 90° to 110° until it contacts either the windshield or side window. However, the elbow cannot be pivoted far enough to permit the finger 28 to pass back through the slot 48.

To remove the body 18 from the headliner 14, the fastener 20 is first removed and then the body 18 is twisted in a reverse direction from the assembly direction.

While specific embodiments of the invention have been shown, described to illustrate the present invention, it is to be understood that the invention may be embodied otherwise without departing from the principals. For example, one skilled in the art will recognize from such a discussion and the accompanying drawings and claims that various modifications and variations can be made without departing from the spirit and scope of the invention as defined in the following claims.

What is claimed is:

1. A mounting assembly for mounting a visor assembly to a headliner of a vehicle, the visor assembly having an elbow extending from a blade, the headliner having at least two hook receiving openings defined therein, said mounting assembly comprising:

a body having with an inner surface to be positioned against the headliner, the body having a boss extending from the inner surface and an aperture extending into said boss adapted for receiving the elbow of the visor assembly, said body further having at least two hooks extending from said inner surface for engaging the hook receiving openings in the headliner, said hooks adapted to engage the hook receiving openings when said inner surface of said body is positioned against the headliner and said body is rotated with respect to the headliner, the body further having a hole defined therein;

a fastener member adapted to be received in said hole in said body and to engage the headliner to prevent the rotation of said body after said hooks engage the hook receiving openings in the headliner.

2. The mounting assembly of claim 1, wherein said boss comprises a cylindrical boss extending coaxially with said aperture from said inner surface of said dish portion.

3. The mounting assembly of claim 1, wherein said at least two hooks comprise three hooks.

4. The mounting assembly of claim 3, wherein said three hooks are equally spaced from said aperture.

5. The mounting assembly of claim 1, wherein said dish portion has a circular circumferential edge.

6. The mounting assembly of claim 5, wherein each of said hooks further comprise an arm portion extending from a post portion, said arm portion having an inner surface spaced a predetermined distance from said circumferential edge of said dish portion, said distance being equal to or less than a thickness of said headliner.

7. The mounting assembly of claim 5, wherein said boss extends beyond a plane aligned with said circumferential edge.

8. The mounting assembly of claim 1, wherein said fastener member is a threaded fastener.

9. The mounting assembly of claim 1, wherein the elbow has a finger extending radially outwardly therefrom and said boss has an abutment portion extending radially inwardly therefrom such that the finger and said abutment portion engage one another and the visor assembly can be used to rotate said body with respect to the headliner.

10. The mounting assembly of claim 9, wherein said body further comprises an annular flange extending inwardly from said boss, said flange having a slot defined therein such that the finger on the elbow can pass through the opening.

11. A mounting assembly for mounting a visor assembly to a headliner of a vehicle, the visor assembly having an elbow extending from a blade, said mounting assembly comprising:

a unitary body adapted to engage the headliner and support the visor assembly, said body having an inner surface to be positioned against the headliner, said body further having a boss extending from said inner surface and an aperture extending into said boss adapted for receiving the elbow of the visor assembly, said body further having at least one engagement member extending from said inner surface, said at least one engagement member adapted to engage the headliner when said inner surface of said body is positioned against the headliner and said body is rotated with respect to the headliner.

12. A mounting assembly for mounting a visor assembly to a headliner of a vehicle, the visor assembly having an elbow extending from a blade, the elbow having an engagement end with a finger extending radially outwardly therefrom, said mounting assembly comprising:

a body having an inner surface to be positioned against the headliner, the body having a boss extending from the inner surface and an aperture extending into said boss adapted for receiving the engagement end of the elbow, said boss further having an abutment portion extending radially inwardly therefrom, said abutment portion adapted to engage the finger on the elbow such that rotation of the elbow causes rotation of the body, said body further having an engagement member adapted to engage the headliner when said inner surface of said body is positioned against the headliner and said body is rotated with respect to the headliner;

the engagement end of the elbow being received in said aperture in said body, with the inner surface of said body positioned against the headliner, when said elbow is rotated such that the finger on the elbow engages said engagement portion to rotate said body and said engagement member engages the headliner.

* * * * *